United States Patent [19]

Dobner et al.

[11] Patent Number: 4,685,648

[45] Date of Patent: Aug. 11, 1987

[54] COUNTERBALANCING APPARATUS FOR USE IN AN OPTICAL INSTRUMENT

[75] Inventors: Michael H. Dobner, Webster; Evan A. Edwards, Pittsford, both of N.Y.

[73] Assignee: Bausch & Lomb Incorporated, Rochester, N.Y.

[21] Appl. No.: 735,414

[22] Filed: May 17, 1985

[51] Int. Cl.⁴ .................... F16M 13/00; G02B 21/32
[52] U.S. Cl. ................................ 248/572; 248/123.1; 248/162.1; 248/332
[58] Field of Search ............ 248/572, 571, 161, 406.2, 248/123.1, 162.1, 648, 292.1, 331, 332, 334.1; 350/530, 529, 521

[56] References Cited

U.S. PATENT DOCUMENTS

| | | | |
|---|---|---|---|
| 2,168,209 | 8/1939 | Haupt | 248/572 |
| 2,901,202 | 8/1959 | Stava et al. | 248/572 |
| 2,924,411 | 2/1960 | Rouverol | 248/572 |
| 3,575,368 | 4/1971 | Thomas et al. | 248/572 |
| 3,895,770 | 7/1975 | Yoshida et al. | 350/530 X |
| 4,351,245 | 9/1982 | Laporte | 248/571 X |

FOREIGN PATENT DOCUMENTS

| | | | |
|---|---|---|---|
| 1208591 | 1/1966 | Fed. Rep. of Germany | 350/521 |
| 1231177 | 4/1960 | France | 248/571 |
| 474008 | 10/1937 | United Kingdom | 248/571 |

Primary Examiner—Ramon S. Britts
Assistant Examiner—Karen J. Chotkowski
Attorney, Agent, or Firm—John Norton; DeWitt Morgan

[57] ABSTRACT

An apparatus for counterbalancing the weight of the movable member in a precision instrument includes a resilient member which is coupled, by way of a non-elastic member, over an eccentric surface of a rotatable member to the movable member. Rotation of the eccentric member causes the resilient member to deform an amount proportional to the eccentricity of the member and a nearly constant counterbalancing force may be applied to the movable member.

3 Claims, 7 Drawing Figures

COUNTERBALANCING APPARATUS FOR USE IN AN OPTICAL INSTRUMENT

BACKGROUND OF THE INVENTION

1. Field of the Invention

This invention relates to an apparatus for counterbalancing, for instance, the weight of the optical head unit in an optical instrument such as a microscope.

2. Description of the Prior Art

Precision optical instruments which require the movement of one member, for example, optical heads or support stages, relative to a fixed member, have utilized various mechanisms to attempt to counterbalance the weight of the movable member. It is mandatory in precision instruments, such as microscopes, that a minimum amount of torque be required to rotate the adjusting knobs which move the movable member throughout the entire range of travel of the movable member.

One mechanism utilized to achieve counterbalance is a mass equal to the weight of the movable member which is suspended on one end of a cable which passes over a fixed pulley. The opposite end of the cable is fixed to the movable member. Obviously, as the movable member is moved up the mass moves down, and vice versa. This mechanism is objectionable as it adds considerable weight to the precision instrument itself, adds significant extra inertia or mass to be moved and requires a substantially larger package to enclose the additional mass.

In recognizing the shortcomings of the above system, several methods have been contemplated which utilize springs of various designs to apply forces, either directly or indirectly, to the movable member to aid in compensating for its weight. For instance, a simple extension coil spring may be suspended from the fixed member by one end while its opposite end is securely attached to the movable member. The spring is calculated to be strong enough to support the weight of the movable member at the point of mid-travel. Moving the member in one direction tends to stretch the spring, while movement in the opposite direction relaxes the spring. Therefore, the spring tends to return the movable member to the neutral mid-travel position. However, in order to keep the movable member in any predetermined position along its travel it is necessary that an additional mechanism must be designed into the apparatus to maintain the position of the movable member and prevent it from returning to the neutral position. Typically, some type of clutch or brake mechanism has been added to the adjusting shaft(s) to counteract the spring force. It will be appreciated that a compression spring mounted below the movable member will act similarly to the extension spring, and therefore have similar problems.

Other attempts at counterbalancing the weight of the movable member have included the use of a torsion spring to act on the drive shaft utilized to urge the movable member up and down. Torsion springs suffer from the same inherent problems as the coil springs described above, as the system is counterbalanced in only the mid-travel position.

Additionally, very long coil springs were tried and, although they were somewhat more acceptable they are costly and require additional space.

In U.S. Ser. No. 650,756 entitled "Cable Drive Focussing Mechanism for Optical Instrument" filed Sept. 14, 1984 for inventors James A. Clark and Michael H. Dobner there is shown a microscope which utilizes a closed loop cable drive mechanism which includes an adjustable torsion spring mechanism for counteracting the forces exerted on the adjusting mechanism by the weight of the movable member. The torsion spring is fixed at one end to the microscope support column while its opposite end is fixed to a collar on the adjusting shaft. The cable is wrapped several times around a wrap reel which is adjustably fixed to the adjusting shaft. By loosening the wrap reel and holding it stationary while rotating the shaft, the torque exerted by the torsion spring may be increased or decreased to compensate for the variations in weight of the stage assembly. However, the torsion spring still only balances the stage assembly at approximately mid-travel and, therefore, requires some type of clutch mechanism as described above. Additionally, travel in either direction beyond mid-point requires either greater or lesser amounts of torque be applied to the adjusting shaft.

The counterbalancing apparatus detailed hereinafter provides a combination of eccentric members and coil springs, to simply but quite effectively, equalize the torque required to rotate the adjusting shaft in a precision instrument, such as a microscope.

SUMMARY OF THE INVENTION

The present invention is directed toward a counterbalancing mechanism for precision instruments, such as microscopes, and includes a resilient member which has one end fixed to the instrument while its opposite end is attached to a cable which passes over an eccentric member which is rotatably fixed to the instrument. The opposite end of the cable is secured to the movable member. Other embodiments utilize combinations of pulleys having uniform and/or non-uniform surfaces to which either the spring or the movable members are attached.

DETAILED DESCRIPTION OF THE PREFERRED EMBODIMENTS

Figure 1:
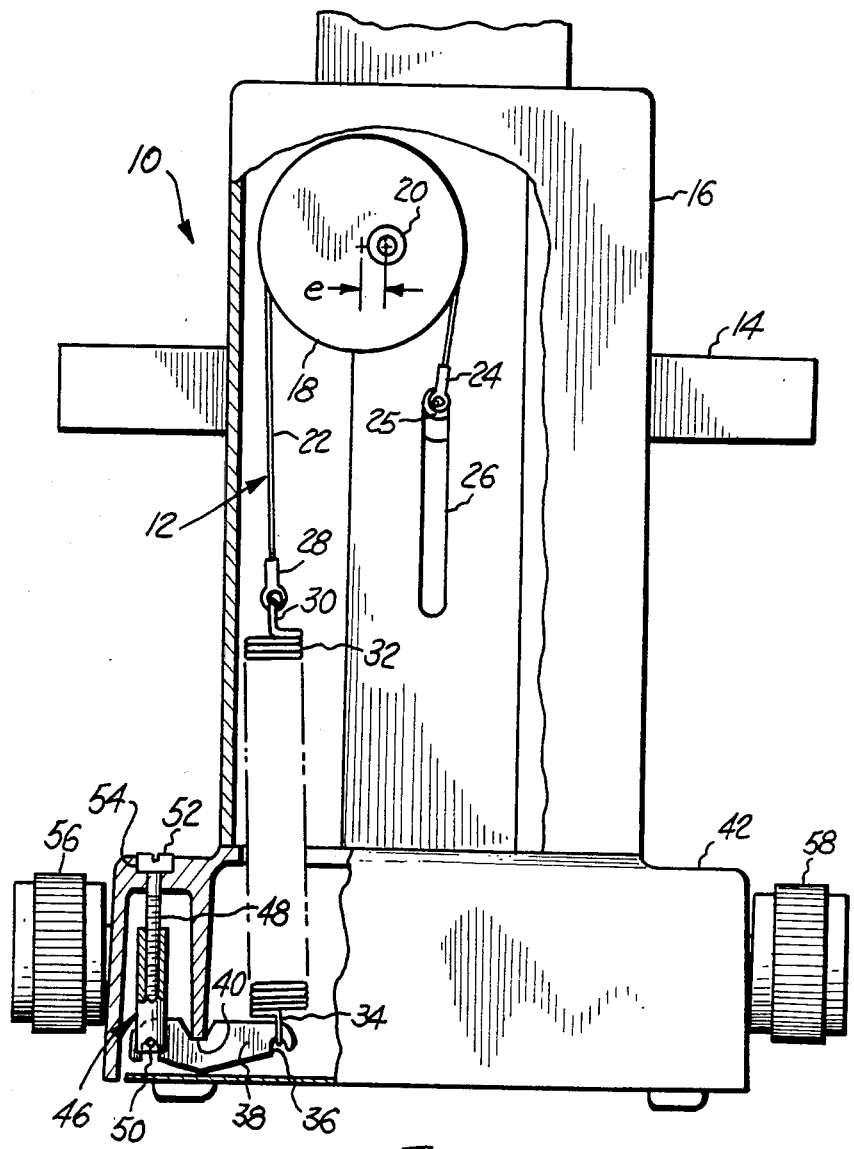
FIG. 1 is a partially broken away rear view of precision instrument incorporating the counterbalancing mechanism of the present invention.

A precision instrument 10, such as a microscope, includes a mechanism 12 for counterbalancing the weight of the movable member 14, as best illustrated in FIG. 1. The movable member which, for instance may be, a stage 14 or a head assembly (not shown), is mounted to stand assembly 16 by any convenient method, or as shown and described in previously referenced U.S. Ser. No. 650,756. A pair of adjusting knobs 56 and 58 are connected to mechanism, not shown, and are utilized to drive the movable member 14 in either direction.

Counterbalance mechanism 12 includes a pulley 18 of radius "R" which is mounted by low friction bearing 20 to stand 16 toward the upper end thereof. The center of bearing 20 is offset a distance "e", as seen in FIGS. 1-4. A non-elastic cable 22 has one end 24 fixed to movable member 14 via bearing 25 which passes through a slot 26 in stand 16. Its other end 28 is fixed to one end 30 of a coil spring 32, whose opposite end 34 is fixed to a notch 36 in rocker arm 38. Additionally, a center part of the cable is fixed to pulley 18, so as not to slip on the pulley 18.

The rocker arm 38 is, for instance, pivotably secured to slot 40 in the microscope base 42 of stand assembly 16 so as to allow oscillation about slot 40. An adjustable clevis 46 includes an internally threaded yoke 48 which is secured to rocker arm 38 by pivot pin 50, and an adjusting screw 52 which is received in stepped aperture 54 formed in base 42.

Figure 2:
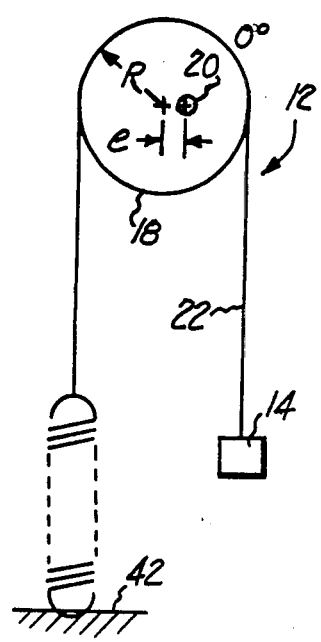
FIG. 2 is a schematic view showing the counterbalancing apparatus with the movable member in the up position.
Figure 3:
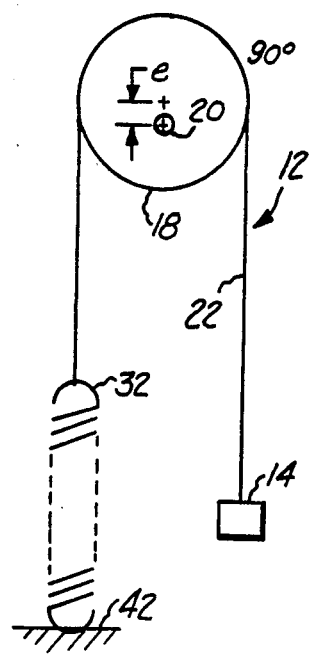
FIG. 3 a schematic view showing the movable member in mid-travel.
Figure 4:
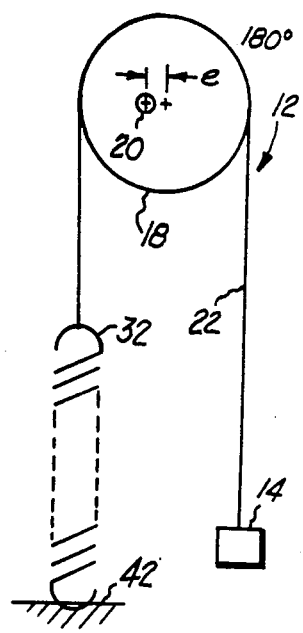
FIG. 4 is a schematic view showing the movable member in the down position.

FIGS. 2-4 illustrate various positions of the movable slide member 14 and counterbalancing mechanism 12 from the up position to the down position. FIG. 2 shows the coil spring 32 in a nearly closed coil state which indicates that the movable member 14 is at the upper limit of its travel. In this position, there is an initial, predetermined force "F" being exerted by the spring 32 which has an initial unextended length of "L". In order to move member 14 to the 90° position of pulley 18 shown in FIG. 3 or the 180° position shown in FIG. 4, it is necessary to stretch the spring to a new length $L+E$, where E is the extension. The force exerted by the spring in the extended positions is represented by the formula $F=K \times E$ where K is the spring rate in, for example, pounds per inch of spring extension.

At the 0° position of the pulley 18, the spring 32 is selected so that the pull exerted by cable 22 on the right hand side of the pulley (as viewed in FIGS. 1-4) is equal to the weight W of the movable member 14. In order for the pulley to be in equilibrium, $$F_{0°}(R+e) = W(R-e)$$

but $F=KE_{0°}$; therefore $$E_{0°}K(R+e) = W(R-e)$$

At the 180° position $$E_{180°}K(R-e) = W(R+e)$$

Also $E_{180°} = E_{0°} + \pi R$ due to the rotation of pulley 18 through one half revolution.

At the 90° position of pulley 18, $F_{90°} = W$, because both forces are acting at equal radii of R, but $$E_{90°} = E_0 + \pi R + e,$$

and $\pi R$ from $\frac{1}{4}$ revolution of the pulley, and $+e$ because the center of the pulley X is raised up an amount equal to e, as shown in FIG. 3.

The above formulas can be combined into one equation to calculate the force "FW" required to counterbalance the weight "W" of the movable member 14 at each angle of rotation of the pulley 18 for an assumed radius "R" of the pulley, eccentricity "e" of the pulley, spring constant "K" of spring 32 and the amount of the initial extension "L" of the spring at the 0° position.

The equation is as follows:

$$F_W = \frac{K[dR + eR\sin\theta + .017R^2\theta + de\cos\theta + e^2\cos\theta\sin\theta + .017eR\theta\cos\theta]}{(R - e\cos\theta)}$$

Where:
K = spring constant
e = eccentricity
θ = angle of rotation
R = radius of pulley
d = initial spring elongation
$F_W$ = output force As an example, in order for a movable member weighing 13 pounds to travel three inches, a pulley radius (R) of 1.25 inches was selected which was eccentrically mounted (e) by 0.28 inches. A 0.750 inch outside diameter spring was chosen that was 4.0 inches long and had a wire diameter of 0.075 inches. The force required to counterbalance the 13 pound movable member would be, of course, 13 pounds through the entire range of vertical travel. Our calculations show that the counterbalancing apparatus of this invention only varied from 12.5 pounds to 13.7 pounds over the entire three inch travel. However, utilizing the exact same spring mounted to an ordinary concentric pulley, would, if adjusted to 13 pounds at mid-travel, give a counterbalancing force of only 4.2 pounds at the top of the travel and over 20 pounds at the bottom of the travel. Such a wide difference in required force from top to bottom is totally unacceptable.

By referring to FIG. 1, it will be understood that the tension of spring 32 may be easily adjusted to exacting tolerances at the mid-travel of the movable member 14. This is achieved by either tightening or loosening screw 52, which in turn causes rocker arm 38 to oscillate about pivot 40. Tightening screw 52 increases tension on spring 32. Conversely, loosening screw 52 decreases tension on spring 32. The geometry of the eccentric pulley, once the movable member is balanced at mid-travel, provides for a uniform counterbalancing force over the entire range of travel.

Figure 5:
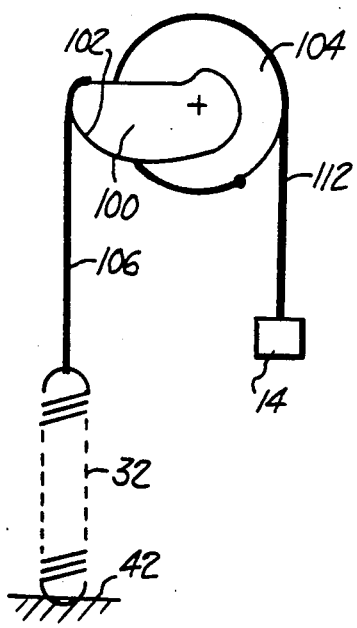
FIGS. 5-7 are schematic diagrams of further embodiments of the counterbalancing mechanism according to the present invention.

FIG. 5 illustrates a pulley 100 having an irregularly shaped surface 102 fixed to a circular pulley 104. Cable 106 is attached at one end to pulley 100 and at its other end to coil spring 32 which is in turn fixed to microscope base 42. A second cable 112 is fixed at one end to pulley 104. Its opposite end is fixed to movable member 14. It will be appreciated, that in the configuration of FIG. 5, the pulley and cable combination can rotate through an arc of up to 270°. Consequently, the physical size of this mechanism can be quite reduced while still maintaining the required amount of travel of movable member 14.

Figure 6:
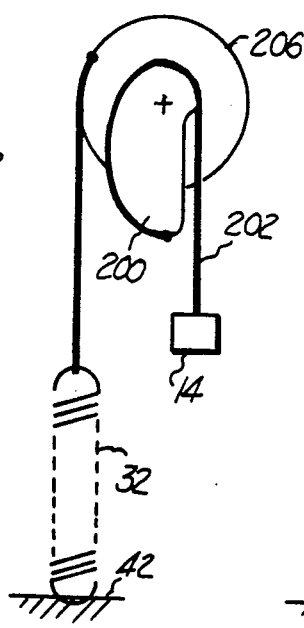

FIG. 6 illustrates a reverse version of FIG. 5 wherein the snail-shaped pulley 200 is attached by cable 202 to movable member 14 while the circular pulley 206 is attached by cable 208 to coil spring 32 which, in turn, is fixed to base 42.

Figure 7:
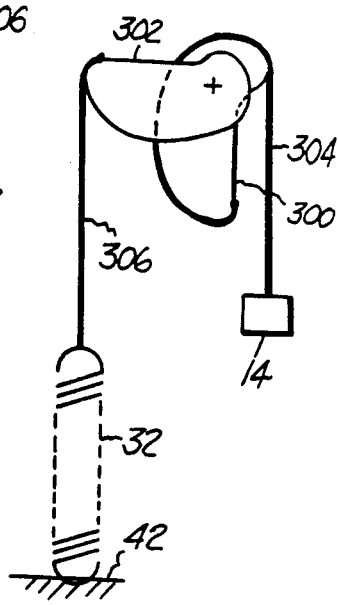

FIG. 7 shows two snail-shaped pulleys 300 and 302. Pulley 300 is attached by cable 304 to movable member 14 whereas pulley 302 is attached by cable 306 to coil spring 32 which is secured to base 42.

In the embodiments schematically illustrated in FIGS. 5-7, the movable member 14 is shown in the up position. All three embodiments offer a compact design with exacting compensation for the weight of the movable member. The snail-shaped pulleys of these embodiments further provide for a variable mechanical ratio between the cable attached to the extension spring and the cable attached to the movable member.

Further in the embodiment shown in FIG. 7, the ratio between the spring cable pull and head cable pull can be made greater without increasing the torque required to drive the adjusting shafts. Therefore, a more compact, but stiffer spring can be utilized and the physical dimensions of the housing can be reduced.

It will be understood that although only certain embodiments of the invention have been shown and described in detail, that there are numerous other embodiments and modifications, which could be made to the present invention without departing from the spirit or scope thereof, as set forth in and defined in the following claims:

We claim:

1. Apparatus for counterbalancing the weight of a first member which is movable with respect to a second member, comprising:
    eccentric means rotatably mounted to said second member;
    resilient means coupled between said first and second members and engaging at least a portion of the periphery of said eccentric means therebetween, said resilient means assisting in counterbalancing the weight of said first member whereby rotation of said eccentric means causes said resilient means to deform an amount at least approximately proportional to the degree of rotation of said eccentric means, the combination of the deformation of said resilient means and the eccentricity of said eccentric member providing a counterbalancing force approximately equal to the mass of said first member; and
    means for adjusting the tension of said resilient means, including a rocker arm pivotally mounted relative to said second member, said rocker arm being connected at one end thereof to said resilient means and at the other end thereof to a clevis adjustably fixed to said second member.

2. The apparatus as set forth in claim 1, wherein said eccentric means comprises first and second pulley members each having defined thereon a non-uniform surface, said pulley members being coaxially mounted for rotation relative to said second member and one of said pulley members is coupled to said resilient means, the other pulley member being coupled by non-elastic means to said first member.

3. Apparatus for counterbalancing the weight of a movable member which is movably mounted relative to a fixed body member, including:
    an eccentric pulley rotatably mounted to said body member;
    a tension spring having a fixed end and a free end, said spring connected at the fixed end thereof to said body member;
    a non-elastic flexible connecting means connected at one end thereof to the free end of said tension spring, said connecting means extending over said eccentric pulley, said connecting means connected at the other end thereof to said movable member; and
    adjustment means to adjust the position of the fixed end of said tension spring to thereby adjust the tension therein, said adjustment means including a rocker arm pivotally mounted relative to said fixed body member, said rocker arm being operatively connected at one end thereof to said fixed end of said tension spring and at the other end thereof to an adjustment screw by which the position of said rocker arm, and therewith the fixed end of said tension spring, is adjustable.

* * * * *